US008784254B2

(12) United States Patent
Zink et al.

(10) Patent No.: US 8,784,254 B2
(45) Date of Patent: Jul. 22, 2014

(54) POWER TRANSMITTING COMPONENT

(71) Applicant: American Axle & Manufacturing, Inc., Detroit, MI (US)

(72) Inventors: Frederick E. Zink, Capac, MI (US); Kevin R. Beutler, Columbiaville, MI (US); James P. Downs, South Lyon, MI (US); Paul J. Valente, Berkley, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 25 days.

(21) Appl. No.: 13/832,341

(22) Filed: Mar. 15, 2013

(65) Prior Publication Data

US 2013/0303323 A1 Nov. 14, 2013

Related U.S. Application Data

(63) Continuation-in-part of application No. 13/470,941, filed on May 14, 2012.

(51) Int. Cl.
| | |
|---|---|
| *F16H 57/04* | (2010.01) |
| *F16H 57/02* | (2012.01) |
| *F16H 57/037* | (2012.01) |
| *B60K 17/34* | (2006.01) |
| *F16J 15/54* | (2006.01) |
| *F16H 57/029* | (2012.01) |

(52) U.S. Cl.
CPC .............. *F16H 57/037* (2013.01); *B60K 17/34* (2013.01); *F16J 15/54* (2013.01); *F16H 57/029* (2013.01)
USPC .................................. 475/159; 74/607; 464/7

(58) Field of Classification Search
CPC F16H 57/021; F16H 57/0408; F16H 57/0421
USPC .......... 475/159; 74/607; 464/7; 277/549, 586
See application file for complete search history.

(56) References Cited

U.S. PATENT DOCUMENTS

| | | | |
|---|---|---|---|
| 2,783,661 A | | 3/1957 | Dryer |
| 3,688,872 A | * | 9/1972 | Wagner ........................ 184/6.28 |

(Continued)

FOREIGN PATENT DOCUMENTS

| | | |
|---|---|---|
| KR | 201999002080 U | 6/1999 |
| KR | 100274035 B1 | 12/2000 |

(Continued)

OTHER PUBLICATIONS

International Search Report and Written Opinion for International Application No. PCT/US2009/053514, dated Mar. 29, 2010.

(Continued)

*Primary Examiner* — Tisha Lewis
(74) *Attorney, Agent, or Firm* — Harness, Dickey & Pierce, P.L.C.

(57) ABSTRACT

A power transmitting component with a housing, a shaft and a seal. The housing has a wall member, a shaft bore, and a shield wall. The shaft bore is formed through the wall member. The shield wall is coupled to and extends outwardly from the wall member. The shield wall is formed about the shaft bore and defines a drain spout. The shaft is received through the shaft bore. The seal is received in the shaft bore and sealingly engages the housing and the shaft. The drain spout is configured to drain liquid from a space that is radially inward of the shield wall when the power transmitting component is disposed in a predetermined orientation.

16 Claims, 7 Drawing Sheets

(56) References Cited

U.S. PATENT DOCUMENTS

| | | |
|---|---|---|
| 4,407,387 A | 10/1983 | Lindbert |
| 4,774,857 A | 10/1988 | Heine et al. |
| 4,915,190 A | 4/1990 | Iwata |
| 5,105,901 A | 4/1992 | Watanabe et al. |
| 5,105,902 A | 4/1992 | Wilson et al. |
| 5,411,110 A | 5/1995 | Wilson et al. |
| 5,562,566 A | 10/1996 | Yang |
| 5,599,249 A | 2/1997 | Zalewski et al. |
| 5,951,428 A | 9/1999 | Itoh et al. |
| 6,113,512 A | 9/2000 | Williams |
| 6,186,258 B1 | 2/2001 | Deutschel et al. |
| 6,263,995 B1 | 7/2001 | Watson et al. |
| 6,805,653 B2 | 10/2004 | Krzesicki et al. |
| 6,814,682 B2 | 11/2004 | Spitale |
| 6,851,501 B2 | 2/2005 | Gassmann |
| 6,974,400 B2 | 12/2005 | Williams |
| 7,150,694 B2 | 12/2006 | Mizon et al. |
| 7,178,425 B2 * | 2/2007 | Marich ............ 74/607 |
| 7,331,896 B1 | 2/2008 | Kroppe |
| 7,416,505 B2 | 8/2008 | Downs |
| 7,533,754 B2 | 5/2009 | Burrows et al. |
| 8,042,642 B2 | 10/2011 | Marsh et al. |
| 8,047,323 B2 | 11/2011 | Downs et al. |
| 2002/0088291 A1 | 7/2002 | Bowen |
| 2005/0023063 A1 | 2/2005 | Mueller |
| 2006/0283654 A1 | 12/2006 | Krisher |
| 2008/0073152 A1 * | 3/2008 | Eleftheriou et al. ......... 184/6.12 |
| 2008/0227582 A1 | 9/2008 | Peura |
| 2009/0176614 A1 * | 7/2009 | Hilker et al. ............... 475/160 |
| 2010/0126306 A1 * | 5/2010 | Ito et al. ............... 74/607 |
| 2010/0216593 A1 | 8/2010 | Ekonen et al. |
| 2011/0275470 A1 | 11/2011 | Ekonen et al. |
| 2011/0319213 A1 | 12/2011 | Ekonen et al. |
| 2012/0029779 A1 | 2/2012 | Dickinson et al. |
| 2012/0073929 A1 | 3/2012 | Grutter et al. |
| 2012/0083380 A1 | 4/2012 | Reed et al. |
| 2014/0127012 * | 5/2014 | Maniar ............ 415/230 |

FOREIGN PATENT DOCUMENTS

| | | |
|---|---|---|
| KR | 100291087 B1 | 3/2001 |
| KR | 100483163 B1 | 4/2005 |
| WO | WO-2010104853 A2 | 9/2010 |

OTHER PUBLICATIONS

International Preliminary Report on Patentability (Chapter I of the Patent Cooperation Treaty) for PCT/US2009/053514, issued Feb. 15, 2011.

International Search Report and Written Opinion for International Application No. PCT/US2010/041767, dated Feb. 28, 2011.

* cited by examiner

POWER TRANSMITTING COMPONENT

CROSS-REFERENCE TO RELATED APPLICATIONS

This application is a continuation-in-part of U.S. patent application Ser. No. 13/470,941 filed May 14, 2012 and entitled "Disconnectable Driveline For All-Wheel Drive Vehicle". The disclosure of the aforementioned application is incorporated by reference as if fully set forth in its entirety herein.

FIELD

The present disclosure relates to a power transmitting component.

BACKGROUND

This section provides background information related to the present disclosure which is not necessarily prior art.

Seals for rotating shafts are used throughout vehicle drive trains in various power transmitting components. A slinger is commonly employed on the rotating shaft of the power transmitting component to protect the seal from impact with solid or water-borne debris to thereby reduce the risk that such debris will impact or work past the sealing lips of the seal. While such configurations are satisfactory for their intended use, there is a need in the art for an improved power transmitting component having improved debris-rejecting capabilities to further protect the seal of a rotating shaft.

SUMMARY

This section provides a general summary of the disclosure, and is not a comprehensive disclosure of its full scope or all of its features.

In one form, the present teachings provide a power transmitting component with a housing, a shaft and a seal. The housing has a wall member, a shaft bore, and a shield wall. The shaft bore is formed through the wall member. The shield wall is coupled to and extends outwardly from the wall member. The shield wall is formed about the shaft bore and defines a drain spout. The shaft is received through the shaft bore. The seal is received in the shaft bore and sealingly engages the housing and the shaft. The drain spout is configured to drain liquid from a space that is radially inward of the shield wall when the power transmitting component is disposed in a predetermined orientation.

In another form, the present teachings provide a power transmitting component with a housing, a shaft and a seal. The housing has a wall member, a shaft bore, and a shield wall. The shaft bore is formed through the wall member. The shield wall defines a lip member and a drain spout. The lip member is disposed concentrically about the shaft bore. The drain spout has a spout member that is coupled to ends of the lip member. The spout member has a V or U-shaped profile that tapers outwardly from the wall member. The shaft is received through the shaft bore. The seal is received in the shaft bore and sealingly engages the housing and the shaft. The drain spout is configured to drain liquid from a space that is radially inward of the shield wall when the power transmitting component is disposed in a predetermined orientation.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
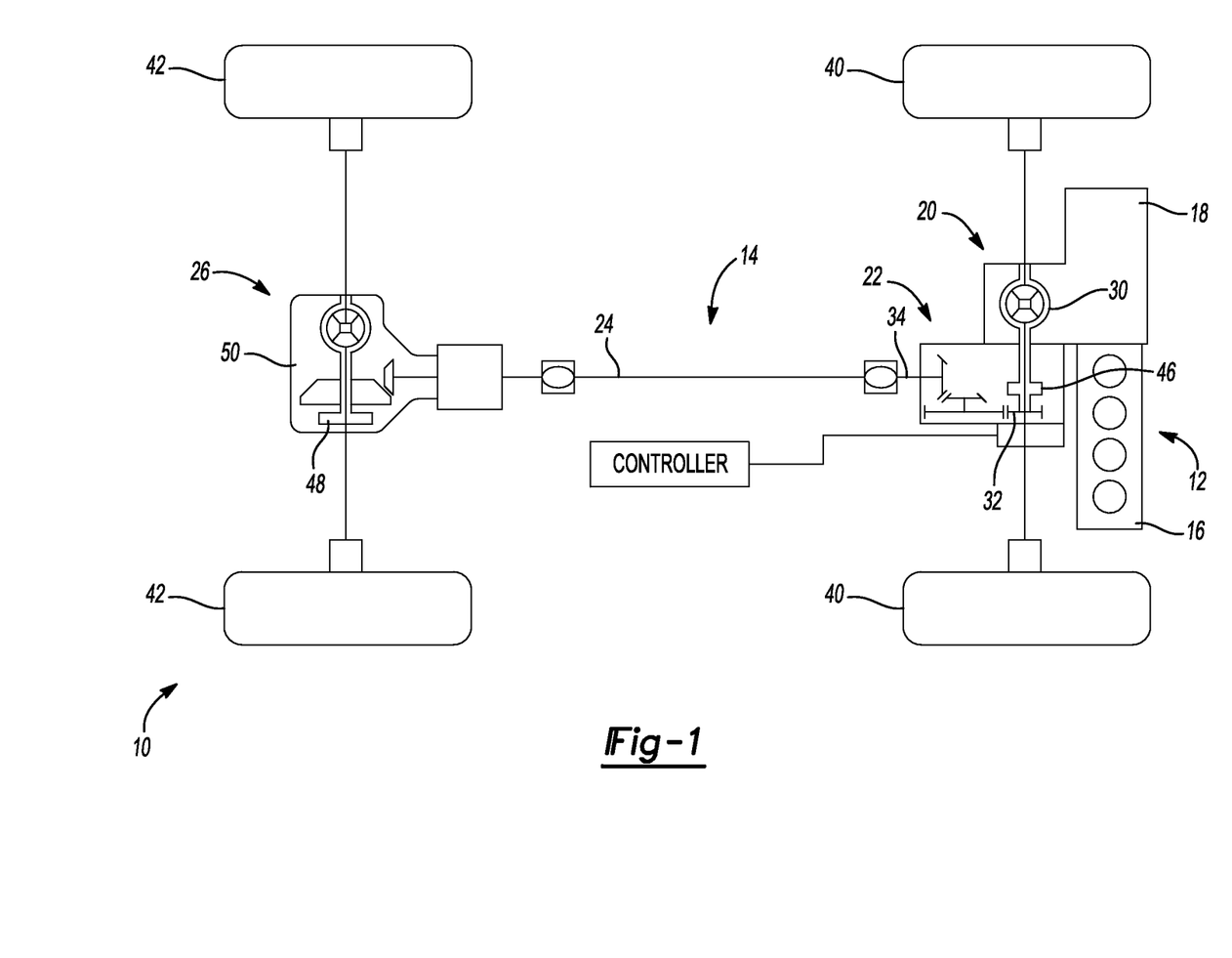
FIG. 1 is a schematic illustration of an exemplary vehicle having a power transmitting component constructed in accordance with the teachings of the present disclosure.

With reference to FIG. 1 of the drawings, an exemplary vehicle having a power transmitting component constructed in accordance with the teachings of the present disclosure is generally indicated by reference numeral 10. The vehicle 10 can have a power train 12 and a drive line or drive train 14. The power train 12 can be conventionally constructed and can comprise a power source 16 and a transmission 18. The power source 16 can be configured to provide propulsive power and can comprise an internal combustion engine and/or an electric motor, for example. The transmission 18 can receive propulsive power from the power source 16 and can output power to the drive train 14. The transmission 18 can have a plurality of automatically or manually-selected gear ratios. The drive train 14 in the particular example provided is of an all-wheel drive configuration, but those of skill in the art will appreciate that the teachings of the present disclosure are applicable to other drive train configurations, including four-wheel drive configurations, rear-wheel drive configurations, and front-wheel drive configurations. The drive train 14 can include a front axle assembly 20, a power take-off unit (PTU) 22, a prop shaft 24 and a rear axle assembly 26. The front axle assembly 20 can be configured in any desired manner, such as a front beam axle or an independent front drive axle. An output of the transmission 18 can be coupled to an input of the front axle assembly 20 to drive an input member 30 of the front axle assembly 20. The PTU 22 can have a PTU input member 32, which can receive rotary power from the input member 30 of the front axle assembly 20, and a PTU output member 34 that can transmit rotary power to the prop shaft 24. The prop shaft 24 can couple the PTU output member 34 to the rear axle assembly 26 such that rotary power output by the PTU 22 is received by the rear axle assembly 26. The rear axle assembly 26 can be configured in any desired manner, such as a rear beam axle, an independent rear drive axle, or a rear drive module. The front axle assembly 20 and the rear axle assembly 26 can be driven on a full-time basis to drive front and rear vehicle wheels 40 and 42, respectively. Alternatively, the drive train 14 can include one or more clutches to interrupt the transmission of rotary power through a part of the drive train 14. In the particular example provided, the drive train 14 includes a first clutch 46, which can be configured to interrupt the transmission of rotary power through the PTU 22 (e.g., decouple the input member 30 of the front axle assembly 20 from the PTU input member 32), and a second clutch 48, which can be configured to halt rotation of components within the rear axle assembly 26.

In the particular example provided, the rear axle assembly 26 includes a rear drive module 50 (i.e., a power transmitting component) that is constructed in accordance with the teachings of the present disclosure. It will be appreciated, however, that the teachings of the present disclosure have application to various other power transmitting components, such as transmissions, power take-offs, torque transfer devices, transfer cases, front axle assemblies, center bearing assemblies for propshafts and any other power transmitting components that have a housing, a shaft and a shaft seal.

Figure 2:
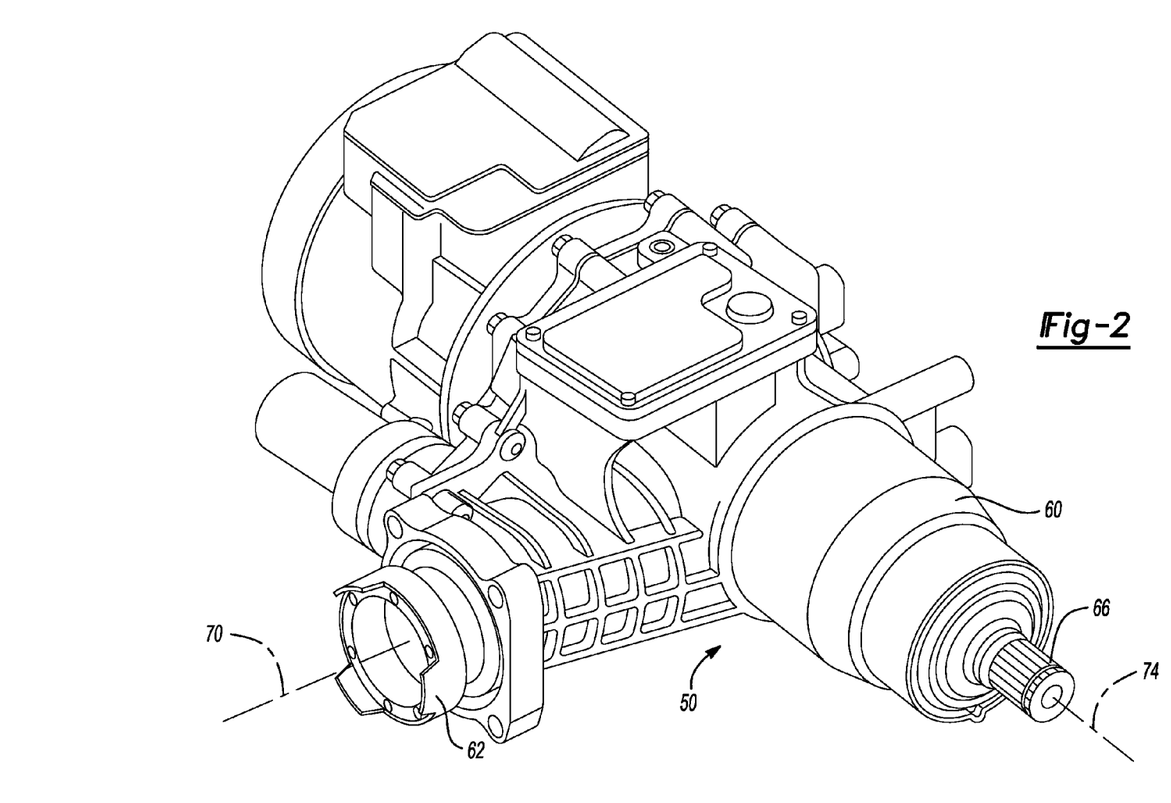
FIG. 2 is a perspective view of the power transmitting component of FIG. 1.
Figure 3:
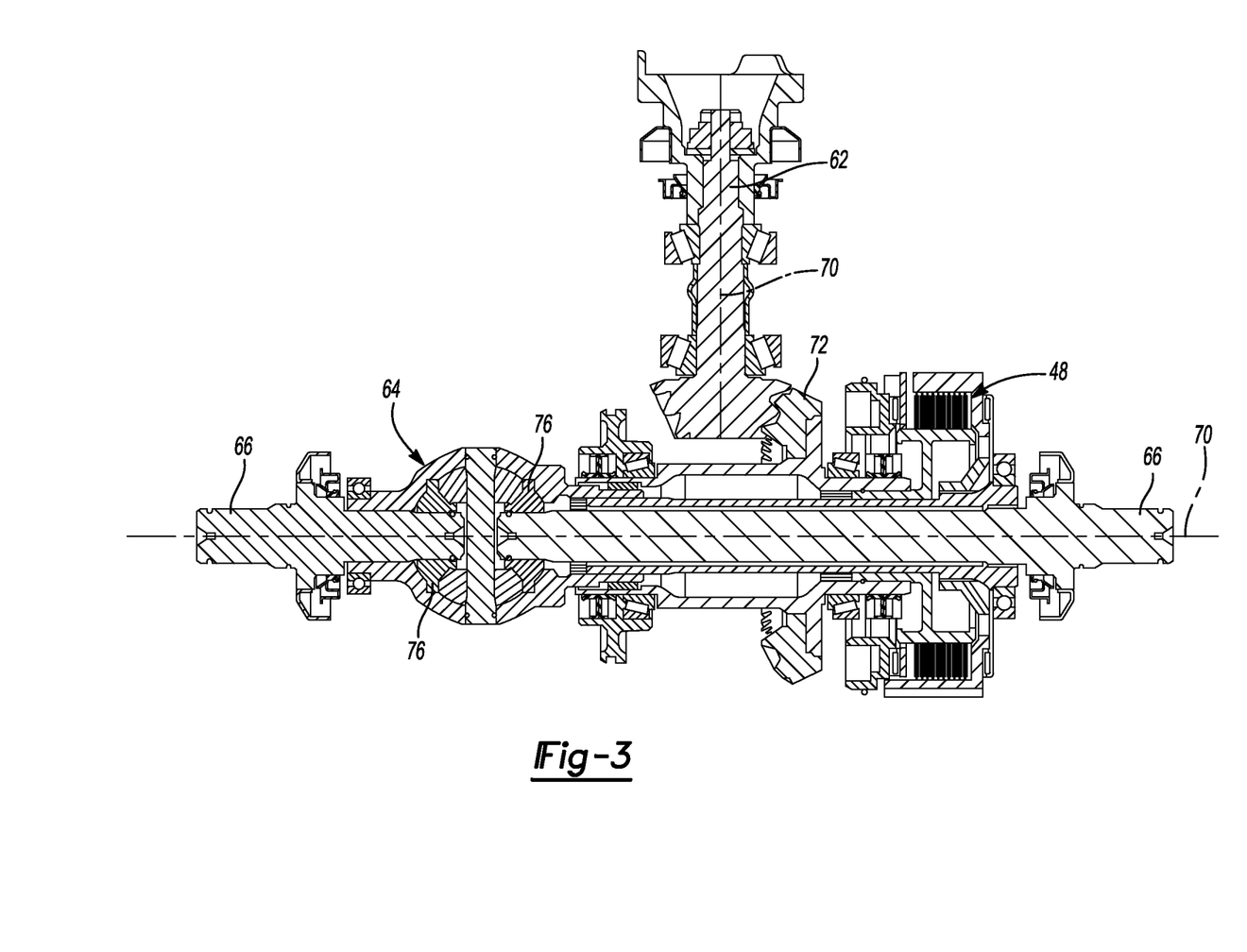
FIG. 3 is a longitudinal section view of a portion of the power transmitting component of FIG. 1.

With reference to FIGS. 2 and 3, the rear drive module 50 is illustrated in more detail. The rear drive module 50 can include a housing 60, an input pinion 62, the second clutch 48, a differential assembly 64, and a pair of output shafts 66. The input pinion 62, the second clutch 48, the differential assembly 64 and the output shafts 66 can be constructed in a manner that is disclosed in co-pending U.S. patent application Ser. No. 13/470,941 and as such, a detailed discussion of these components is not needed herein. Briefly, the input pinion 62 is a hypoid pinion and is supported for rotation in the housing 60 along a first axis 70. The second clutch 48 can include an input ring gear 72 that can be disposed about a second axis 74 that can be generally perpendicular to the first axis 70. The second clutch 48 can be selectively operated to transmit rotary power to the differential assembly 64. In the particular example provided, the second clutch 48 is a friction clutch that is mounted co-axially with the differential assembly 64. Each of the output shafts 66 can have a first end, which can be drivingly coupled to a respective one of the output members 76 of the differential assembly 64, and a second, opposite end that can be coupled to a corresponding one of the rear wheels 42 (FIG. 1).

Figure 4:
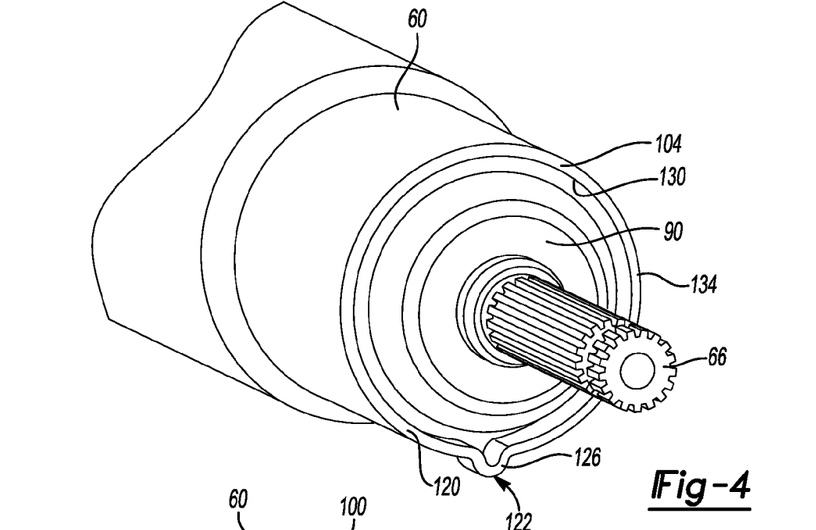
FIG. 4 is a perspective view of a portion of the power transmitting component of FIG. 1 depicting a location where an output shaft of the power transmitting component exits a housing of the power transmitting component.
Figure 5:
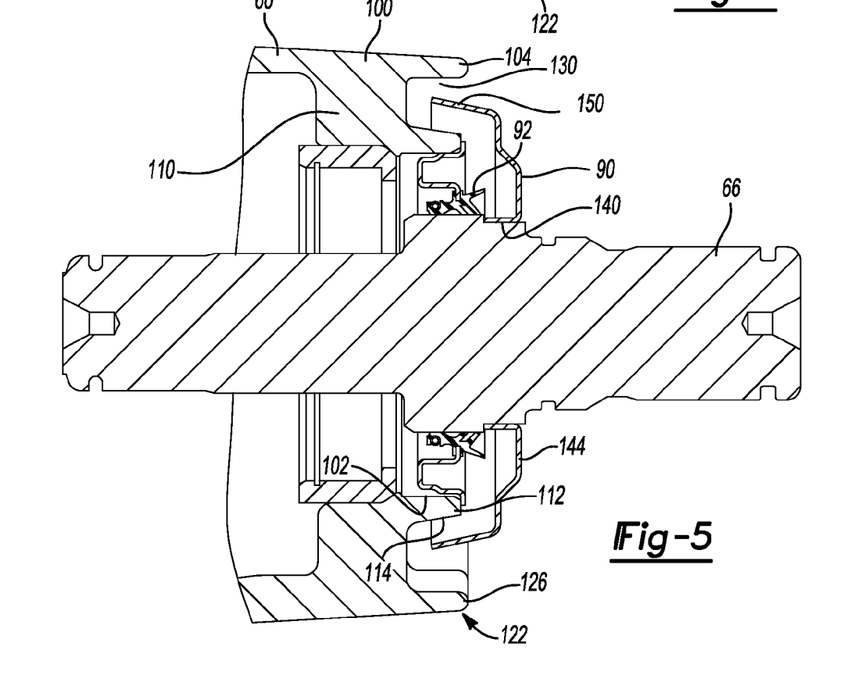
FIG. 5 is a section view of a portion of the power transmitting component of FIG. 1 taken longitudinally through the shaft.

With reference to FIGS. 4 and 5, one of the output shafts 66 is illustrated as extending from the housing 60 and a slinger 90 is coupled to the output shaft 66 to shield a shaft seal 92.

Figure 6:
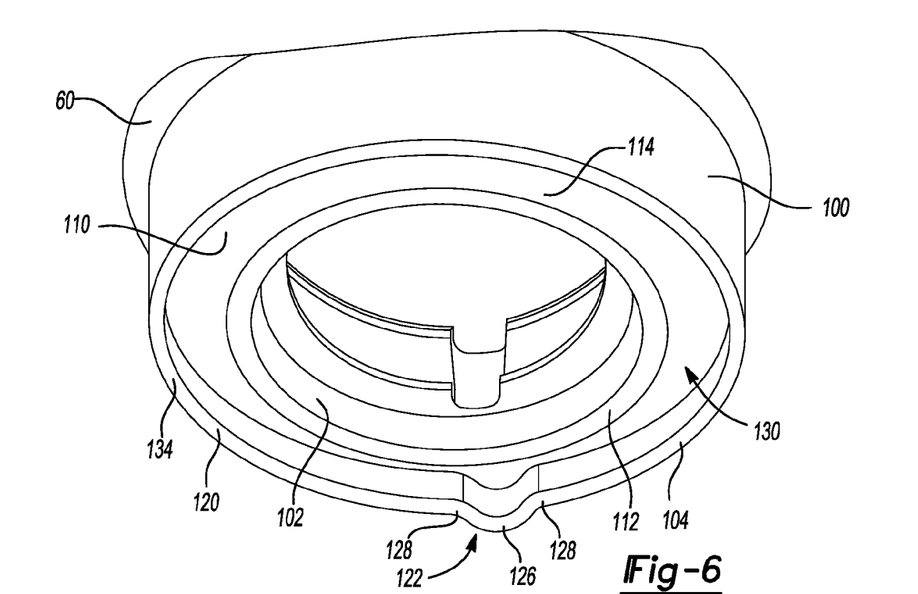
FIGS. 6 and 7 are top and bottom perspective views of a portion of the housing of the power transmitting component of FIG. 1.
Figure 7:
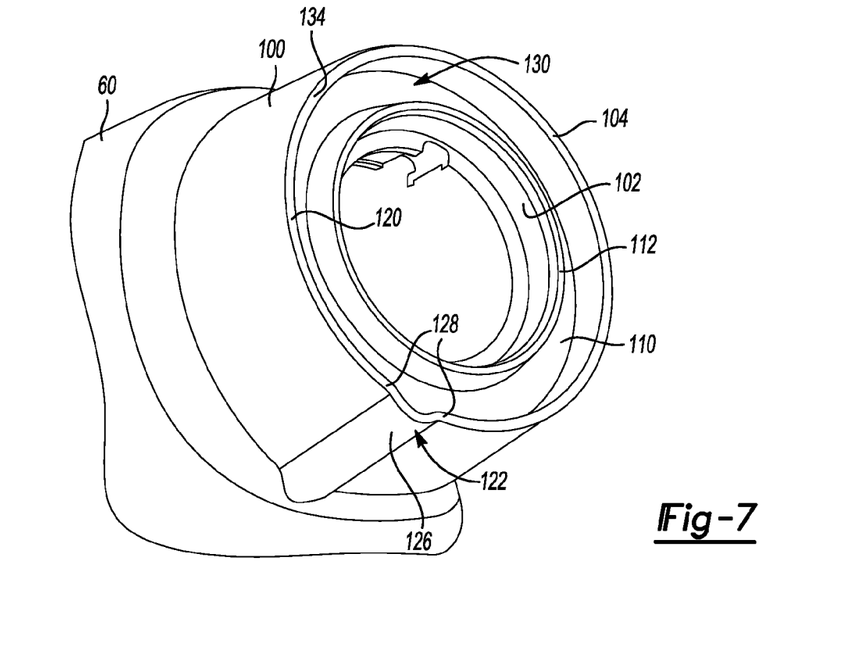

With reference to FIGS. 5 through 7, the housing 60 can have a wall member 100, a shaft bore 102 and a shield wall 104. The wall member 100 can have an annular portion 110 and an annular projection 112 that can extend axially from the annular portion 110. The shaft bore 102 can be formed through the annular projection 112. The annular projection 112 can have a radially outward side 114 that can be frustoconically shaped. The shield wall 104 is coupled to and extends axially outwardly from the wall member 100. The shield wall 104 can be formed about the shaft bore 102 and can define a lip member 120 and a drain spout 122. The lip member 120 can be disposed concentrically about the shaft bore 102. The drain spout 122 can have a spout member 126 that is coupled to the ends 128 of the lip member 120. The spout member 126 can have a V-shaped or U-shaped profile that can taper axially and radially outwardly from the wall member 100. The drain spout 122 is configured to drain a liquid (not shown) from a space 130 that is radially inward of the shield wall 104 when the power transmitting component (i.e., the rear drive module 50) is disposed in a predetermined orientation. In the particular example provided, the predetermined orientation is the orientation of the rear drive module 50 when the wheels 40 and 42 (FIG. 1) of the vehicle 10 (FIG. 1) are disposed on flat, level ground. While the drain spout 122 is depicted in the particular example provided as being located vertically below the remaining portion 134 of the shield wall 104 when the power transmitting component is in the predetermined orientation, it will be appreciated that the drain spout 122 can be located in various different positions if desired.

Returning to FIG. 5, the output shaft 66 is received through the shaft bore 102. The shaft seal 92 is received in the shaft bore 102 and sealingly engages the output shaft 66 and the annular projection 112 on the housing 60. The slinger 90 can have a mount 140, which can be fixedly coupled to the output shaft 66 for rotation therewith, and a flange 144 that can be coupled to the mount 140 and extend radially outwardly therefrom into the space 130 confined by the shield wall 104. A distal end 150 of the flange 144 can extend radially outwardly of the shaft seal 92. If desired, a portion of the flange 144 (e.g., the distal end 150) can be tapered so that it extends outwardly toward the shield wall 104 with decreasing distance to the annular portion 110 of the wall member 100.

Figure 8:
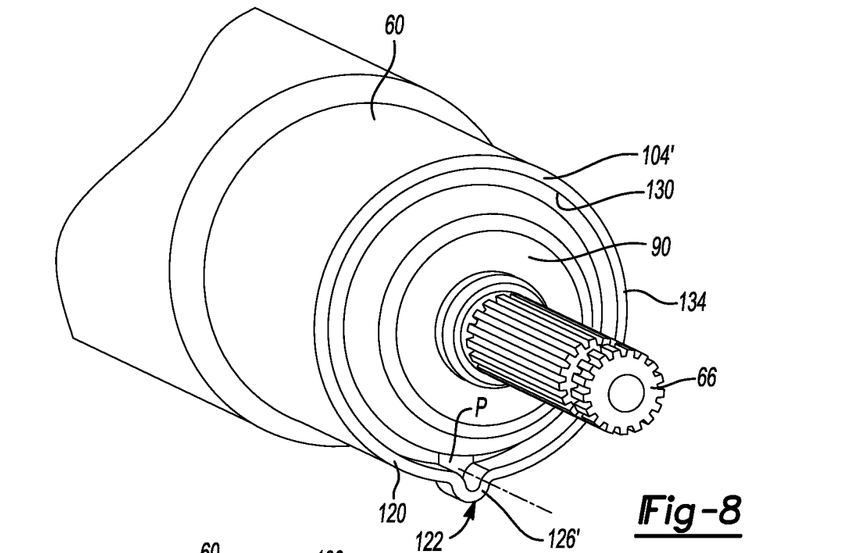
FIG. 8 is a perspective view of a portion of another power transmitting component constructed in accordance with the teachings of the present disclosure.
Figure 9:
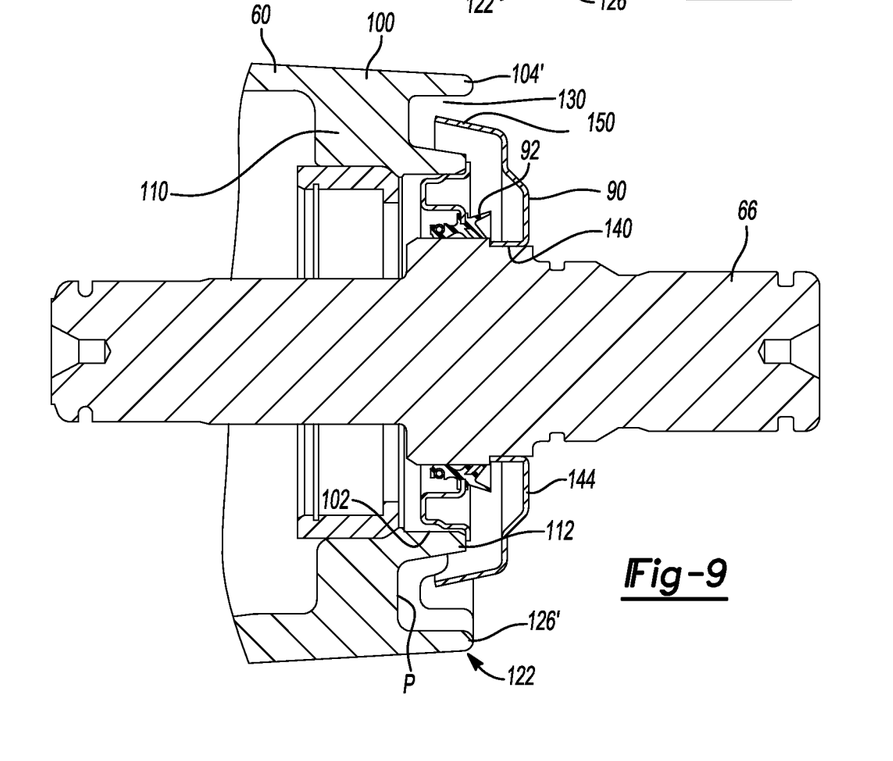
FIG. 9 is a section view of a portion of the power transmitting component of FIG. 8 taken longitudinally through a shaft.
Figure 10:
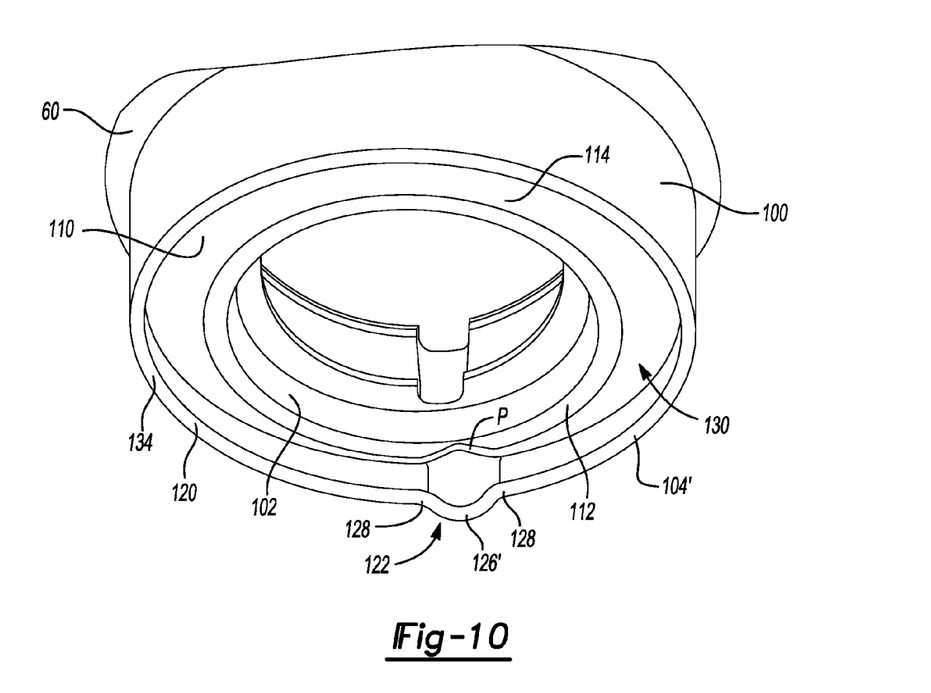
FIG. 10 is a top perspective view of a portion of the power transmitting component of FIG. 8.

With reference to FIGS. 8 through 10, a portion of a second power transmitting component constructed in accordance with the teachings of the present disclosure is illustrated. This second example can be generally similar to the first example discussed above, except that the spout member 126' extends generally deeper into the shield wall 104' and is sized to form a pocket P that is located behind the distal end 150 of the slinger 90. Construction in this manner may help to purge fluid and/or debris from a location that is located axially between the slinger 90 and the wall member 110.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power transmitting component comprising:
a housing having a wall member, a shaft bore, and a shield wall, the shaft bore being formed through the wall member, the shield wall being coupled to and extending outwardly from the wall member, the shield wall being formed about the shaft bore and defining a drain spout;
a shaft received through the shaft bore; and
a seal received in the shaft bore and sealingly engaging the housing and the shaft;
wherein the drain spout is configured to drain liquid from a space that is radially inward of the shield wall when the power transmitting component is disposed in a predetermined orientation.

2. The power transmitting component of claim 1, further comprising a slinger coupled to the shaft, the slinger extending radially outwardly from the shaft and into the space.

3. The power transmitting component of claim 2, wherein an end of the slinger tapers outwardly toward the shield wall with decreasing distance to the wall member.

4. The power transmitting component of claim 2, wherein the drain spout terminates at a pocket located axially between the slinger and the shield wall.

5. The power transmitting component of claim 1, wherein the wall member comprises an annular projection to which the seal is mounted.

6. The power transmitting component of claim 5, wherein a radially outward side of the annular projection has a frusto-conical shape.

7. The power transmitting component of claim 1, wherein the drain spout is located vertically below a remaining portion of the shield wall when the power transmitting component is disposed in the predetermined orientation.

8. The power transmitting component of claim 1, further comprising a friction clutch and a differential assembly, the friction clutch being mounted in the housing coaxially with the differential assembly.

9. A power transmitting component comprising:
a housing having a wall member, a shaft bore, and a shield wall, the shaft bore being formed through the wall member, the shield wall being coupled to and extending outwardly from the wall member, the shield wall defining a lip member and a drain spout, the lip member being disposed concentrically about the shaft bore, the drain spout having a spout member that is coupled to ends of the lip member, the spout member having a V or U-shaped profile that tapers outwardly from the wall member;
a shaft received through the shaft bore; and
a seal received in the shaft bore and sealingly engaging the housing and the shaft;
wherein the drain spout is configured to drain liquid from a space that is radially inward of the shield wall when the power transmitting component is disposed in a predetermined orientation.

10. The power transmitting component of claim 9, further comprising a slinger coupled to the shaft, the slinger extending radially outwardly from the shaft and into the space.

11. The power transmitting component of claim 10, wherein an end of the slinger tapers outwardly toward the shield wall with decreasing distance to the wall member.

12. The power transmitting component of claim 10, wherein the drain spout terminates at a pocket located axially between the slinger and the shield wall.

13. The power transmitting component of claim 9, wherein the wall member comprises an annular projection to which the seal is mounted.

14. The power transmitting component of claim 13, wherein a radially outward side of the annular projection has a frusto-conical shape.

15. The power transmitting component of claim 9, wherein the drain spout is located vertically below a remaining portion of the shield wall when the power transmitting component is disposed in the predetermined orientation.

16. The power transmitting component of claim 9, further comprising a friction clutch and a differential assembly, the friction clutch being mounted in the housing coaxially with the differential assembly.

\* \* \* \* \*